US011223479B1

(12) United States Patent
Firestone et al.

(10) Patent No.: US 11,223,479 B1
(45) Date of Patent: Jan. 11, 2022

(54) RESILIENCE AGAINST DENIAL OF AVAILABILITY ATTACKS IN A SECURE DECENTRALIZED P2P FILESYSTEM

(71) Applicant: CyLogic, Inc., Chevy Chase, MD (US)

(72) Inventors: Adam Firestone, Alexandria, VA (US); Hilary L. MacMillan, Ashburn, VA (US); Raghu Lingampally, Hyderabad (IN)

(73) Assignee: CyLogic, Inc., Chevy Chase, MD (US)

( * ) Notice: Subject to any disclaimer, the term of this patent is extended or adjusted under 35 U.S.C. 154(b) by 0 days.

(21) Appl. No.: 17/398,340

(22) Filed: Aug. 10, 2021

Related U.S. Application Data

(60) Provisional application No. 63/228,186, filed on Aug. 2, 2021, provisional application No. 63/226,265, filed (Continued)

(51) Int. Cl.
*H04L 9/32* (2006.01)
*G06F 21/60* (2013.01)
(Continued)

(52) U.S. Cl.
CPC .......... *H04L 9/3236* (2013.01); *G06F 21/602* (2013.01); *G06F 21/606* (2013.01); *G06F 21/6218* (2013.01); *H04L 9/0825* (2013.01)

(58) Field of Classification Search
CPC ... H04L 9/3236; H04L 9/0825; H04L 67/104; G06F 21/602; G06F 21/606;
(Continued)

(56) References Cited

U.S. PATENT DOCUMENTS 7,356,531 B1  4/2008  Popelka et al.
7,802,310 B2  9/2010  Farber et al.
(Continued)

OTHER PUBLICATIONS

Li, Keqin, "Analysis of random time-based switching for file sharing in peer-to-peer networks," 2010 IEEE International Symposium on Parallel & Distributed Processing, Workshops and Phd Forum (IPDPSW) Year: 2010 | Conference Paper | Publisher: IEEE.*

(Continued)

*Primary Examiner* — Roderick Tolentino
(74) *Attorney, Agent, or Firm* — Kasha Law LLC; John R. Kasha; Kelly L. Kasha (57) ABSTRACT

A unique identifier id(f) is generated for file f and stored on a content address server. A symmetric encryption key KF is generated for file f. File f is divided into n segments. A unique identifier $id(s_i)$ is generated for each segment $s_i$. Each segment $s_i$ of the n segments is encrypted using the symmetric key KF using a symmetric encryption algorithm, producing n encrypted segments $es_i$. Each encrypted segment $es_i$ is stored with its identifier $id(s_i)$ on the first peer device and at least one other peer device. For each encrypted segment $es_i$, the identifier $id(s_i)$ is stored on the content address server with the identifier id(f). A public key KU2 of a second user is retrieved, the symmetric key KF is encrypted with key KU2, producing wrapped key $KW2=EA_{KU2}(KF)$, and key KW2 is stored on the content address server with identifier id(f).

17 Claims, 6 Drawing Sheets

Related U.S. Application Data on Jul. 28, 2021, provisional application No. 63/226,241, filed on Jul. 28, 2021, provisional application No. 63/170,331, filed on Apr. 2, 2021.

(51) Int. Cl.
*G06F 21/62* (2013.01)
*H04L 9/08* (2006.01)

(58) Field of Classification Search
CPC .. G06F 21/6218; G06F 3/067; G06F 11/1004; G06F 2221/2107
See application file for complete search history.

(56) References Cited

U.S. PATENT DOCUMENTS

| | | | |
|---|---|---|---|
| 8,001,096 B2 | 8/2011 | Farber et al. | |
| 8,255,366 B1* | 8/2012 | Bagley | G06F 11/1469 707/646 |
| 9,363,247 B2 | 6/2016 | Murray | |
| 9,819,663 B1 | 11/2017 | Gauda | |
| 9,965,483 B2 | 5/2018 | Beaverson et al. | |
| 10,255,340 B2 | 4/2019 | King, III et al. | |
| 10,664,574 B1* | 5/2020 | Powers | G06F 21/6218 |
| 2009/0193252 A1* | 7/2009 | Wajs | H04L 67/06 713/165 |
| 2010/0293097 A1* | 11/2010 | Pomeroy | H04L 67/104 705/58 |
| 2011/0225276 A1* | 9/2011 | Hamilton, II | G06F 9/5027 709/223 |
| 2013/0013931 A1* | 1/2013 | O'Hare | H04L 9/085 713/189 |
| 2014/0280753 A1* | 9/2014 | Kinsman | H04L 67/1072 709/219 |
| 2019/0057115 A1* | 2/2019 | Liu | H04L 9/3263 |
| 2019/0068615 A1* | 2/2019 | Pack | H04L 9/3236 |
| 2019/0342084 A1* | 11/2019 | Mehedy | H04L 9/0643 |
| 2020/0081999 A1* | 3/2020 | Mueller | H04L 9/3239 |

OTHER PUBLICATIONS

Qiu et al., "A decentralized authorization scheme for DRM in P2P file-sharing systems," 2011 IEEE Consumer Communications and Networking Conference (CCNC)Year: 2011 | Conference Paper | Publisher: IEEE.*

Brian, et al. "JigDFS: A secure distributed file system." 2009 IEEE Symposium on Computational Intelligence in Cyber Security (2009).

* cited by examiner

FIG. 6 ns, filed on Aug. 2,
RESILIENCE AGAINST DENIAL OF AVAILABILITY ATTACKS IN A SECURE DECENTRALIZED P2P FILESYSTEM

RELATED APPLICATIONS

This application claims the benefit of U.S. Provisional Patent Application Ser. No. 63/228,186, filed on Aug. 2, 2021, the content of which is incorporated by reference herein in its entirety.

INTRODUCTION

The teachings herein relate to a decentralized or distributed filesystem. More particularly the teachings herein relate to systems and methods for generating and decrypting persistent user cryptographic keys in a peer-to-peer distributed file system and providing resiliency against denial of availability attacks by storing each generated file on at least two peer devices. The systems and methods herein can be performed in conjunction with a processor, controller, or computer system, such as the computer system of FIG. 1.

Denial of Availability Attacks

Modern computer networks have evolved around the notion of information and infrastructure security focused on centralization and logical implementations of perimetric physical security paradigms (colloquially known as "guards, gates, and guns"). While this paradigm offers some benefits with respect to the economics of technology, management efficiency, and security, it has been found to be vulnerable with respect to availability attacks. These attacks fall into two main categories: 1) Those with the goal of denying access to information by rendering the devices or systems responsible for managing and providing the information unable to perform those services (DoS or DDoS), and 2) those with the goal of rendering the information itself inaccessible to legitimate users by encrypting it with keys that are only made available after the payment of some amount of funds (ransomware).

These attack methodologies are enabled by a technical paradigm that centrally stores a single copy of any particular datum that is then made available on request by an authorized user, in what is commonly referred to as the "client-server" or "hub and spoke" model. If the server, or hub is adversely impacted by an attack, a natural event, or human error, the superset of entities (e.g., clients) that depend on that server are unable to access their information. This is an architectural vulnerability that cannot be remedied by revision, patching, or technical appliques. To borrow a software development colloquialism, it's a feature, not a bug.

One response to the shortcomings of the conventional, centralized data and information architecture has been the development of decentralized file and storage systems. Decentralized file and storage systems can ensure resilience with respect to availability attacks or incidents by distributing data between all participants rather than homing it on a centralized on-premises or Cloud server. However, the design of the decentralized file or storage system is critical to ensuring resilience. In some configurations, the data is always retrieved from the originating node. In such cases, the system isn't truly decentralized, but instead exhibits properties of "loosely coupled centralization," where, rather than a network of peers, the scheme comprises a set of what can best be described as a federation of servers. Attacking one server in this case renders the information resident on that server unavailable. While this is arguably an improvement over a centralized architecture in that only some of the organization's information is unavailable due to the attack, it fails to solve the resiliency problem.

A true decentralized architecture includes a mechanism to distribute data upon commitment, thus ensuring that there is no single point of failure or vulnerability for any single datum. In such a scheme, all participating peers become super-nodes that are simultaneously clients and servers, eliminating the need for centralized file management infrastructure, and enabling organizations that embrace decentralization to reduce or eliminate the vulnerabilities and risks associated with availability incidents.

Despite their advantages, decentralized file systems have not enjoyed widespread adoption due to the fact that they are difficult to configure and control, and as a result, organizations view them less in terms of their advantages (i.e., resilience to availability incidents) and more in terms of a competing risk (i.e., loss of data control) that outweighs the benefits when compared to conventional client-server architectures that are not resilient with respect to availability incidents.

While there are decentralized, distributed file systems available, such as those described below, there are none that have seamlessly integrated mechanisms that address both the automatic distribution problem and the data control problem concurrently in a manner sufficient to support enterprise and government use. As a result, there exists an unmet need for systems and methods that allow for resilience against denial of availability attacks and cryptographic key management in a distributed, decentralized, or P2P file system.

Decentralized File Systems

Modern computer networks have evolved around the notion of information and infrastructure centralization. While this paradigm has offered benefits in terms of physical and information security for data residing on an organization's servers, and a concentration of management resources, it has often been found lacking with respect to data durability and economy of operation. Regarding data durability, centralization creates a single point of failure. If the server or data center is rendered unavailable or inoperable, the organization(s) reliant on the information residing on that physical infrastructure can find themselves without access to their most critical resource. Additionally, the operational costs associated with information technology infrastructure, as well as the skilled professionals required to operate it, are very significant, and often pose a constraint on organizational goals and ambitions.

The response to the conventional paradigm has been the development of the decentralized file system. Decentralized file systems ensure data durability by distributing information between all participants rather than in one central hub that represents a single point of failure. They neutralize denial of availability attacks such as ransomware through the use of content-based addressing instead of conventional location-based addressing that mitigates or eliminates the attackers' return on investment (ROI) as well as enabling rapid restoration of impacted systems. Content-based addressing turns all participants into super-nodes that are simultaneously clients and servers, eliminating the need for centralized file management infrastructure, and enabling organizations that embrace decentralization to reduce or eliminate the associated hardware and personnel costs.

Despite their advantages, decentralized file systems have not enjoyed widespread adoption due to the fact that they do not provide adequate information confidentiality. That is, their underlying architecture ensures that all participants have access to all information at all times. This runs contrary to organizational requirements to safeguard data and control access.

Instead, decentralized file systems have primarily be used for public file sharing. For example, BitTorrent is a popular peer-to-peer (P2P) public file-sharing protocol.

Figure 2:
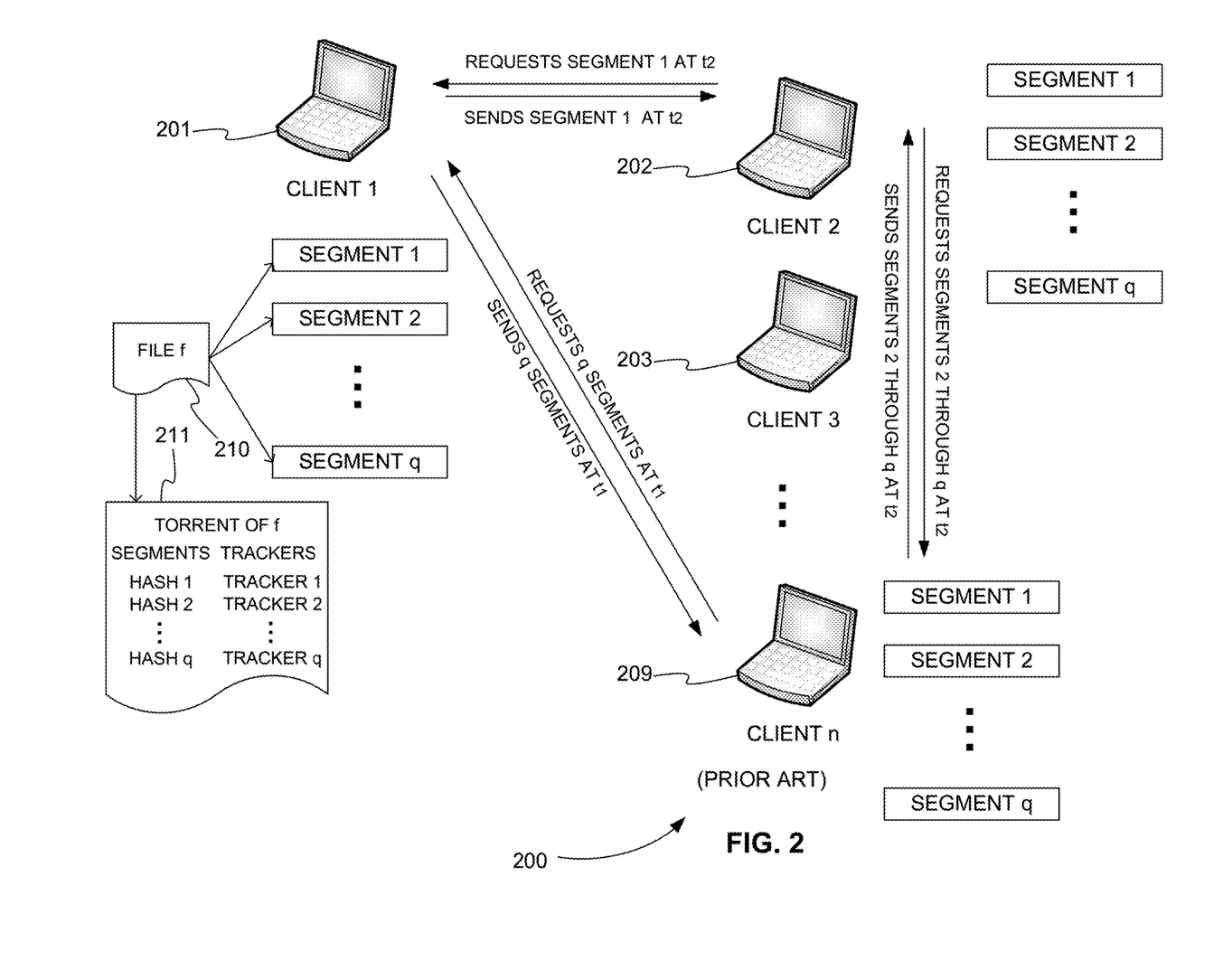
FIG. 2 is an exemplary diagram showing how a file is publicly shared by a BitTorrent client application.

FIG. 2 is an exemplary diagram 200 showing how a file is publicly shared by a BitTorrent client application. For example, in order to share file 210 originally located only on client device 201, a BitTorrent client application of client device 201 divides file 210 into q equal length pieces or segments and hashes each segment with a unique cryptographic hash key or hash value, producing q cryptographic hash values. The BitTorrent client application of client device 201 then creates a descriptor file 211, called a torrent, for file 210 that uniquely identifies the file.

A cryptographic hash value is a bit array of fixed size that uniquely and mathematically represents the data of a file, for example. The cryptographic hash value is found from the data of the file using a mathematical algorithm. As a result, a reconstructed file, for example, can be verified by applying the mathematical algorithm to the data of the reconstructed file and then comparing the cryptographic hash value that is produced with the previous cryptographic hash value of the original file.

Descriptor file 211 includes at least two lists. The first list is a list of the q cryptographic hash values corresponding to the q equal length segments. The second list is a list of m tracker devices (servers) that keep track of client devices (peers) that include one or more of the segments of file 210.

To enable sharing of file 210, for example, descriptor file 211 is sent to the m tracker devices (not shown). Since no segments have been shared at this point, each of the m tracker devices is only aware that client device 201 includes all of the segments of file 210.

At time $t_1$, for example, a BitTorrent client application of client device 209 is looking for file 210 and finds file descriptor 211 on one of the m tracker devices or some other server device, or is sent torrent or file descriptor 211 by someone referring the user of client device 209 to file 210. File descriptor 211 additionally includes the filename of file 210 and metadata about file 210. File descriptor 211 can be found on a tracker or another server using a filename or piece of metadata. Using file descriptor 211 and information from the tracker, client device 209 learns that device 201 includes q segments of file 210 and requests all q segments from client device 201 since it is currently the only client to include any segment.

In response, the BitTorrent client application of client device 201 sends all q segments to client device 209. The BitTorrent client application of client device 209 then updates the m tracker devices to let them know that, in addition to client device 201, client device 209 now has a copy of all q segments of file 210. Finally, client device 209 reconstructs file 210 from the q segments of file 210 using the q cryptographic hash values of file descriptor 211.

At a later time $t_2$, for example, a BitTorrent client application of client device 202 is also looking for file 210 and finds file descriptor 211 on one of them tracker devices. Using file descriptor 211 and information from the tracker, client device 202 learns that both devices 201 and 209 include q segments of file 210. The BitTorrent client application of client device 202 determines the most efficient method of obtaining the q segments of file 210 from devices 201 and 209. For example, client device 202 requests segment 1 from device 201 and segments 2 through q from device 209.

In response, the BitTorrent client application of client device 201 sends segment 1 to client device 202, and client device 209 sends segments 2 through q to client device 202. The BitTorrent client application of client device 202 then updates the m tracker devices to let them know that, in addition to client devices 201 and 209, client device 202 now has a copy of all q segments of file 210. Finally, client device 202 reconstructs file 210 from the q segments of file 210 using the q cryptographic hash values of file descriptor 211.

FIG. 2 illustrates how a file is found and downloaded in BitTorrent using a tracker. In more recent versions of BitTorrent, peers or client devices can locate a torrent directly using a distributed hash table (DHT). A DHT is a lookup service with key-value pairs. In theory, the DHT is decentralized. In practice, it is typically located on one or two servers. To find the location of nearby (in the network sense) client devices that include the desired file, a client device queries the DHT using a hash of the torrent of the desired file. The returned list of client devices is then used to retrieve segments of the file.

Figure 3:
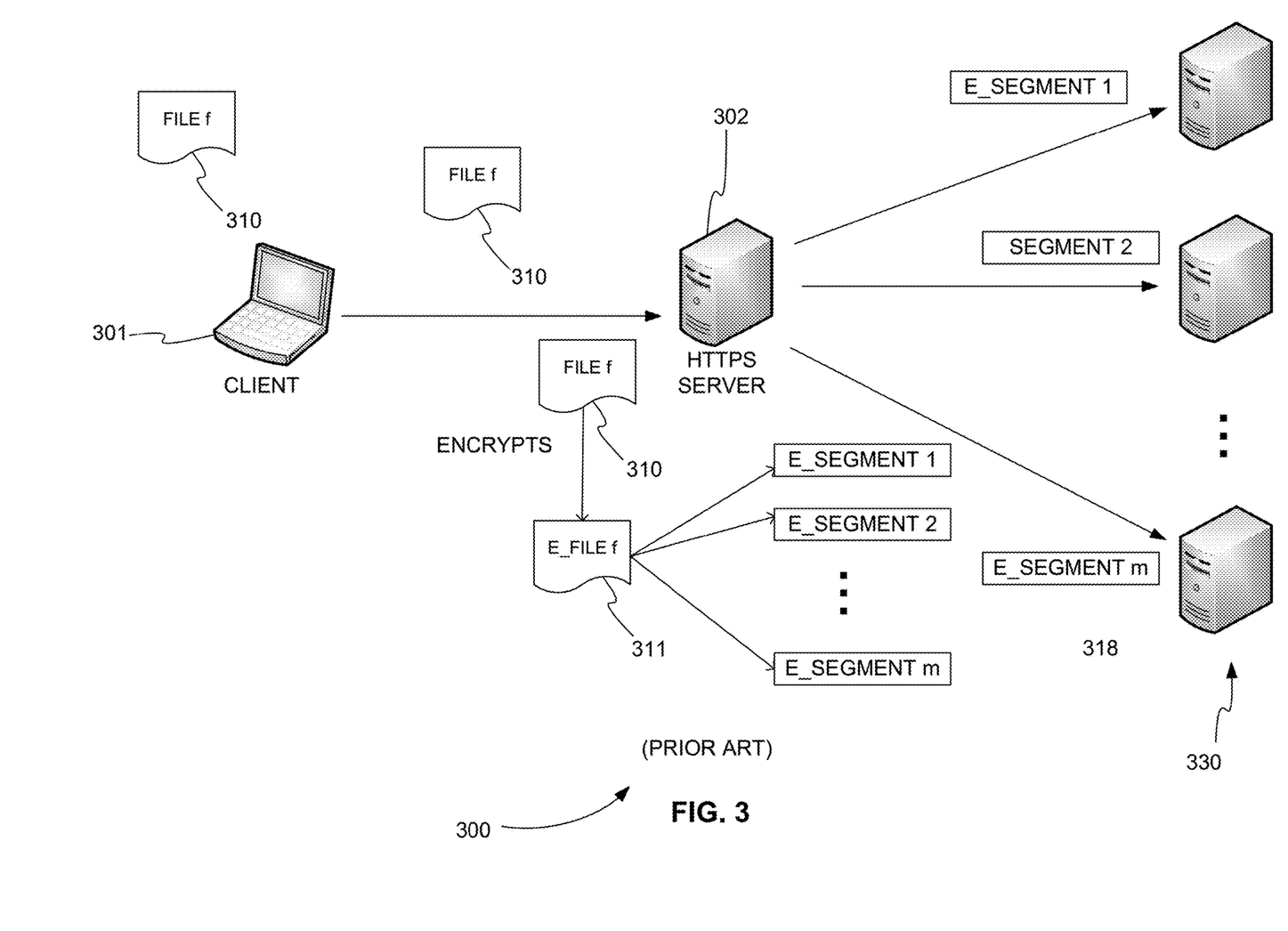
FIG. 3 is an exemplary diagram showing how a file is securely stored in Tahoe-LAFS.

Although popular for sharing publicly available information, BitTorrent is not suitable for use as a distributed file system because it lacks facilities for maintaining information confidentiality among users. Tahoe least-authority file store (Tahoe-LAFS) is an exemplary open-source distributed data store that is sometimes described as a distributed file system. Tahoe-LAFS includes a method for maintaining information confidentiality among users FIG. 3 is an exemplary diagram 300 showing how a file is securely stored in Tahoe-LAFS. File 310 is, for example, created on client device 301. Instead of storing file 310 on client device 301, Tahoe-LAFS sends unencrypted file 310 to secure hypertext transfer protocol (HTTPS) server 302 using a secure HTTPS connection to HTTPS server 302. HTTPS server 302 encrypts file 310 and then divides encrypted file 311 into m pieces or segments using erasure coding. Erasure coding allows file 311 to be reconstructed from some number of the m segments that is less than m. Each of the m segments is then distributed to a different server among servers 330.

When client 301 wants to retrieve file 310, it requests the file from HTTPS server 302. HTTPS server 302 then retrieves some number of the m segments that is less than m from servers 330, decodes the segments producing encrypted file 311, and decrypts file 311 producing file 310. File 310 is then returned to client 301 using a secure HTTPS connection from HTTPS server 302.

Tahoe-LAFS securely stores files but is not a P2P system. Instead, Tahoe-LAFS acts like a redundant array of inexpensive disks (RAID) system where servers are used in place of local storage or disk drives. Tahoe-LAFS is therefore not conducive to file sharing among client devices.

Cleversafe is another distributed data store that can be used as a distributed file system. Like Tahoe-LAFS, Cleversafe divides encrypted files into m pieces or segments using erasure coding and stores the segments on different servers. Additionally, Cleversafe uses unique object identifiers (IDs) to identify each file in the system. This allows Cleversafe to store tiles in a flat-file system rather than in a tree-like hierarchical structure, which is most commonly used by traditional file systems. A flat file system can allow more data to be stored.

Unfortunately, also like Tahoe-LAFS, Cleversafe is not a P2P system. It is again more similar to a RAID system, where servers are used in place of local storage or disk drives. It is, therefore, less useful for sharing files.

Further, Bian, J. and R. Seker. "JigDFS: A secure distributed file system." 2009 *IEEE Symposium on Computational Intelligence in Cyber Security* (2009): 76-82 (hereinafter the "Bian Paper") describes another problem with Tahoe-LAFS and Cleversafe. The Bian Paper suggests that the lack of anonymity or deniability in systems like Tahoe-LAFS and Cleversafe makes them less useful in commercial or business settings. For example, the use of central servers in Tahoe-LAFS and Cleversafe make it easier to track the owners or editors of certain files. As a result, it would be possible, for example, to link a file for anonymous feedback to its editors in these systems.

In response to this problem, the Bian Paper proposes the jigsaw distributed file system (JigDFS). JigDFS is a secure P2P distributed file system. According to the Bian Paper, the use of a fully P2P distributed system "eliminates the possible leakage of user information from a central server."

Figure 4:
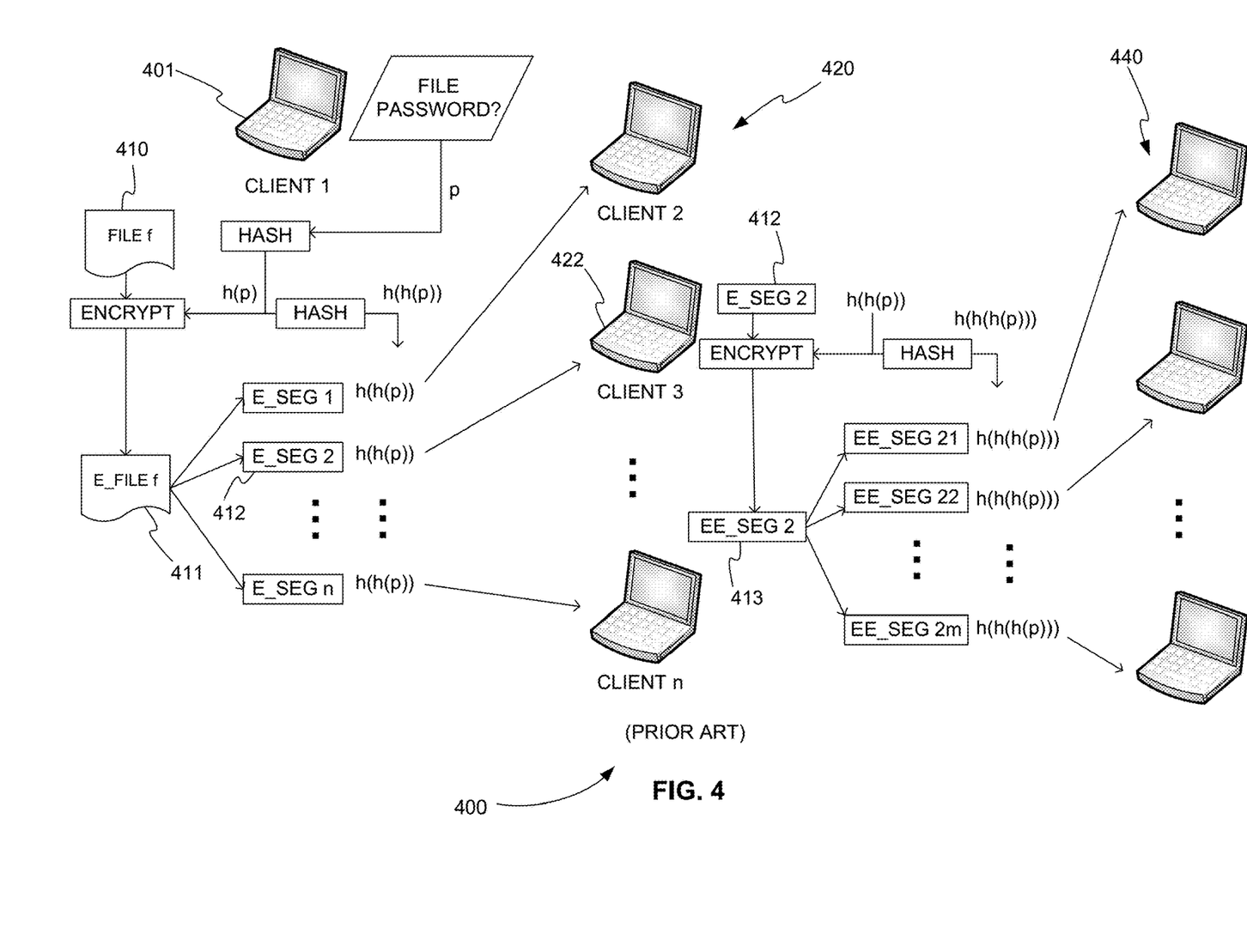
FIG. 4 is an exemplary diagram showing how a file is securely stored in JigDFS.

FIG. 4 is an exemplary diagram 400 showing how a file is securely stored in JigDFS. File 410 is, for example, created on client device 401. In order to save file 410, a client application of JigDFS on client device 401 prompts the user of client device 401 for a password, p, for file 410. The client application hashes p with a hash algorithm to produce hash value h(p). The client application then encrypts file 410 using the hash value h(p), producing encrypted file 411. The client application divides encrypted file 411 into n slices or segments using erasure coding. The client application also hashes hash value h(p) using the hash algorithm to produce hash value h(h(p)).

The client application of JigDFS on client device 401 sends each segment of the n segments to one of n different client devices 420. Along with each segment, the client application sends the hash value h(h(p)). In other words, the client application sends a segment and hash value pair to each client device of client devices 420.

A hash value is sent along with each segment because JigDFS uses a hashed-key chain algorithm to create a hierarchy tree for each file. In other words, JigDFS further segments the segments of a file in each level or layer of a hierarchy of client devices. Each subsequent layer of client devices stores segments of file segments stored in a previous layer. At each layer, segments of a layer segment are encrypted using the hash value sent with the layer segment.

Consequently, for example, segment 412 of the encrypted file is sent to client device 422 along with hash value h(h(p)). In turn, the client application of JigDFS on client device 422 encrypts segment 412 using hash value h(h(p)), producing doubly encrypted segment 413. The client application divides doubly encrypted segment 413 into m slices or segments using erasure coding. The client application also hashes hash value h(h(p)) using the hash algorithm to produce hash value h(h(h(p))).

The client application of JigDFS on client device 422 sends each segment of the m segments to one of m different client devices 440 in the next layer of client devices. Along with each segment, the client application sends the hash value h(h(h(p))).

This iterative segmenting of file segments continues until a desired file security level (FSL) is reached. Like the password, p, that starts the hierarchy of hash values, the FSL (not shown) is specified or input by the user who saves file 410 on client device 401.

Like BitTorrent, JigDFS can retrieve a file using a DHT. A hash value of each file, h(f), is stored with each segment of the file in the file indexing DHT. When a user requests the file using h(f), the file segments are retrieved from the bottom layer of the hierarchical tree of client devices and sent to the user's client device along routes described by the DHT. Eventually, the user's client device will receive enough segments to recover the encrypted file. The user will then enter the password, p, again to decrypt the reconstructed file using h(p).

Ultimately, sharing a file in JigDFS requires sharing the password, p, of the file. This can provide anonymity since it is not possible to determine the user of the password. It also, however, means that the confidentiality of any file is dependent on the confidentiality of the password. In other words, if the password ends up in the wrong hands, the file system has been breached and there is no way to identify who breached the system. In addition, strong passwords are notoriously difficult to remember and, therefore, often end up being saved using unsecure methods or systems such as an unsecure file.

U.S. Pat. No. 9,363,247 (hereinafter the "'247 Patent") is directed to a method of securely storing blocks of a file across many different storage resources of a computer cluster or cloud system. In the method of '247 Patent, an unencrypted file is saved by sending the unencrypted file to a computer cluster using a secure connection, as is done in Tahoe-LAFS. A computing resource of the computer cluster then divides the file into n blocks, generates a different symmetric key for each block, and then encrypts each block using its symmetric key.

The computing resource of the computer cluster can save each encrypted block of the n blocks on a different storage resource of the computer cluster. Along with each encrypted block, the computer resource stores an encrypted version of the symmetric key used to encrypt the block. The symmetric key is encrypted using a symmetric user key. This encrypting of a key with another key can be referred to as key-wrapping.

In the method of the '247 Patent, a user obtains a user key from a key manager that is separate from but securely connected to the computer cluster or as part of the computer cluster. A user obtains a user key to store or gain access to a file. When a file is stored, the symmetric key of each encrypted block is encrypted with a user key of the user storing the file, and the wrapped key is stored with the encrypted block.

If the file is to be shared among a group of k users including the user saving the file, for example, the computer resource of the computer cluster encrypts the symmetric key of each encrypted block with each of the user keys of the k users, producing k wrapped keys. The computer resource reconstructs the file for a user of the group of k users by first decrypting the wrapped key for the user of each encrypted block, producing the symmetric key for each encrypted block. Each encrypted block is then decrypted, and the decrypted blocks are reconstructed to produce the file for the user.

The method of the '247 Patent describes using a semi-trusted client threat model. Essentially, this means that a user is authenticated using the secure connection to the computer cluster. As a result, the user can obtain the symmetric user key from the key manager and be verified via the secure connection.

The '247 Patent provides an improvement over JigDFS by allowing files to be shared without having to share a password. However, the use of the secure connection in the method of the '247 Patent to obtain symmetric user keys from a key manager makes the key wrapping technique of the '247 Patent unsuitable for a P2P distributed file system. In other words, relying on a secure connection between all peers in a P2P system in order to authenticate user keys significantly increases the complexity of the system. It also provides a point of failure and attack.

SUMMARY

Systems and methods are disclosed for securely sharing a file among peer devices in a distributed P2P filesystem and for securely retrieving a file in a distributed P2P filesystem. A system for securely sharing a file among peer devices in a distributed P2P filesystem includes a public-key server, a content address server, and a first peer device.

The public key server stores one or more public keys of an asymmetric cryptographic algorithm for one or more users. The content address server stores information about one or more files.

The first peer device generates a unique identifier id(f) for a file f and stores the identifier id(f) on the content address server. The first peer device divides the file f into n segments. The first peer device generates a unique identifier id($s_i$) for each segment s of the n segments. The first peer device generates a symmetric encryption key KF for encrypting the n segments. The first peer device encrypts each of the n segments using the symmetric key KF using a symmetric encryption algorithm, producing n encrypted segments.

The first peer device stores each encrypted segment $es_i$ of the n segments with its identifier id($s_i$) on the first peer device identified by a unique peer identifier $l_1$ and at least one other peer device identified by a unique peer identifier $l_2$. For each encrypted segment $es_i$, the first peer device stores the identifier id($s_i$) on a content address server with the identifier id(f). Finally, the first peer device retrieves from a public key server a public key KU2 of a second user who can share the file f, encrypts the symmetric key KF with the public key KU2 using an asymmetric encryption algorithm, producing wrapped key KW2=$EA_{KU2}$(KF), and stores the wrapped key KW2 on the content address server with the identifier id(f).

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

Figure 1:
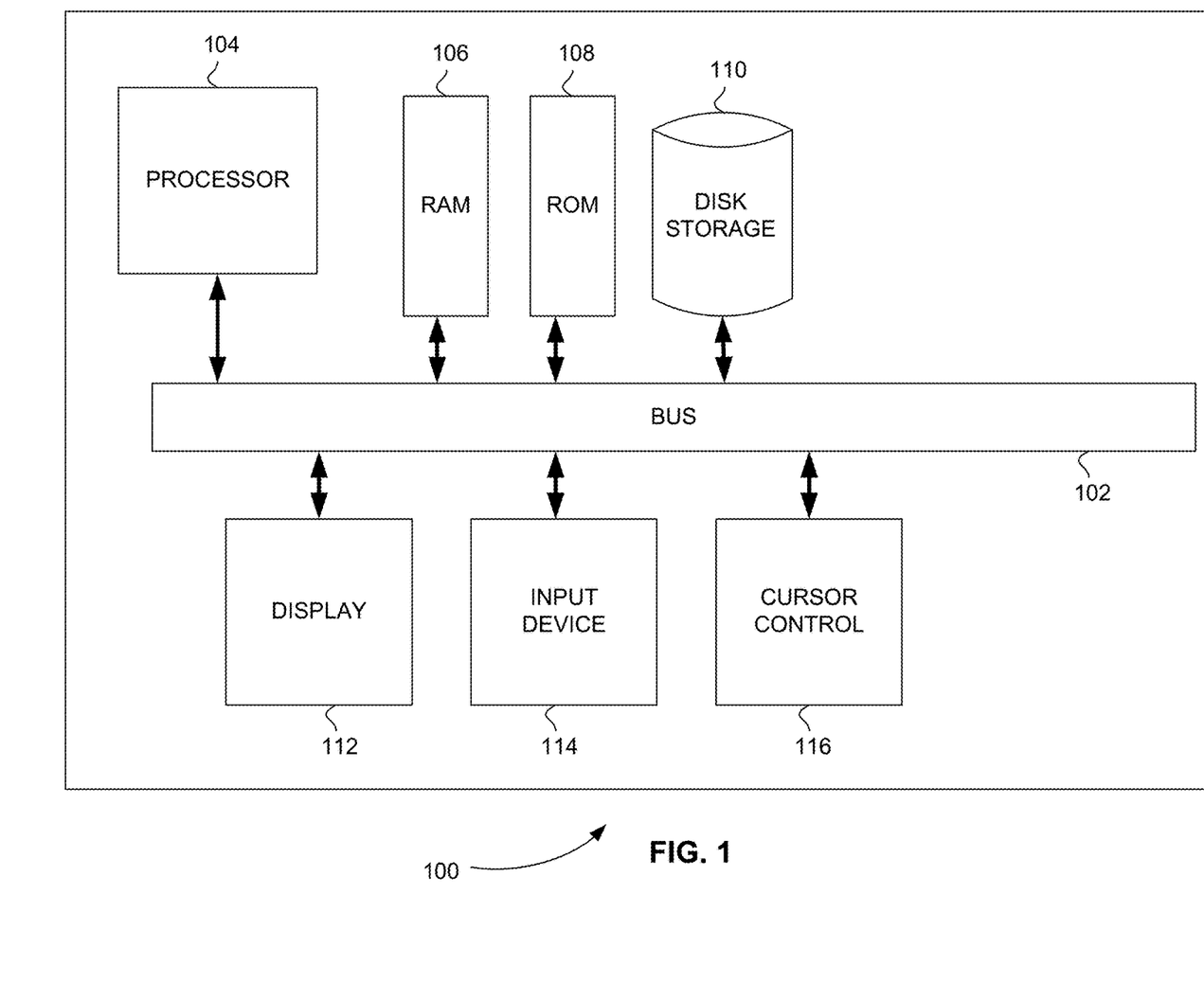
FIG. 1 is a block diagram that illustrates a computer system, upon which embodiments of the present teachings may be implemented.

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

The term "computer-readable medium" or "computer program product" as used herein refers to any media that participates in providing instructions to processor 104 for execution. The terms "computer-readable medium" and "computer program product" are used interchangeably throughout this written description. Such a medium may take many forms, including but not limited to, non-volatile media, volatile media, and precursor ion mass selection media. Non-volatile media includes, for example, optical or magnetic disks, such as storage device 110. Volatile media includes dynamic memory, such as memory 106.

Common forms of computer-readable media include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Resilience Against Denial of Availability

As described above, modern computer networks have been found to be vulnerable with respect to availability attacks. These attacks fall into two main categories: 1) Those with the goal of denying access to information by rendering the devices or systems responsible for managing and providing the information unable to perform those services (DoS or DDoS), and 2) those with the goal of rendering the information itself inaccessible to legitimate users by encrypting it with keys that are only made available after the payment of some amount of funds (ransomware).

These attack methodologies are enabled by a technical paradigm that stores a single copy of any particular datum that is then made available on request, or what is commonly referred to as the "client-server" or "hub and spoke" model. One response to the shortcomings of the conventional, centralized data and information architecture has been the development of decentralized file and storage systems.

Despite their advantages, decentralized file systems have not enjoyed widespread adoption due to the fact that they are difficult to configure and control, and as a result, organizations view them less in terms of their advantages (i.e., resilience to availability incidents) and more in terms of a competing risk (i.e., loss of data control) that outweighs the benefits when compared to conventional client-server architectures that are not resilient with respect to availability incidents. While there are decentralized, distributed file systems available, there are none that have seamlessly integrated mechanisms that address both the automatic key or data distribution problem and the data control problem concurrently in a manner that provides sufficient inherent resilience with respect to attack to support enterprise and government use. As a result, there exists an unmet need for systems and methods that allow for inherent resilience against denial of availability attacks, and cryptographic key management in a distributed, decentralized, or P2P file system.

Various embodiments solve both the availability incident resiliency and data control problems. The availability incident resiliency problem is solved through the provision of a decentralized file and storage system that automatically distributes data subject to its control upon commitment to one or more peers. Various embodiments solve the data control problem by ensuring that data is only made available in a cryptographically meaningful manner to specific, authenticated, and authorized peers. Consequently, an availability incident impacting a subset of an organization's networked peers does not result in a non-trivial (if any) loss of data, and also enables the rapid reconstitution and recovery for any peers impacted by the incident.

Availability attacks are forms of malicious cyber activities intended to prevent legitimate users from accessing data or systems. These activities include DoS or DDoS attacks, the goal of which is to overload a targeted server's processing capability with by flooding the target with so much traffic (sending it information) that a system crash is triggered, malware attacks known as ransomware, in which the victim's data files are encrypted and a ransom demanded in return for which access to the files is restored, and others, such as those resulting in permanent damage or destruction of computing resources.

Various embodiments mitigate the risks and challenges posed by availability attacks through a combination of decentralized file management, automated file confidentiality management and automated file integrity verification. To provide these capabilities, various embodiments include a number of subcomponents, including: a file management system, a decentralized lookup service, a content-addressed storage system, a cryptographic management system, and a file integrity verification system. This combination simultaneously enables improved data availability, improved deterrence to malicious actors, improved data integrity guarantees, resilience with respect to denial of availability attacks, and improved resistance to malware attacks. The benefits of this confidentiality-availability-resilience system include improved security and availability of data, a reduction in risk associated with common malicious activity such as data theft, ransomware and DoS attacks, and reduction in the costs associated with improved resilience with respect to availability.

In various embodiments, the addition of cryptography/confidentiality management is important with respect to the business practices of the global ransomware/malware industry, and reflects the understanding that as with any other industry, ransomware organizations assess the likely ROI before committing an investment of time and other resources. They do this by segmenting the attack process into discrete phases:

Phase 0: Initial penetration and of the target organization's IT infrastructure.

Phase 1: Identification and exfiltration of as much of the target organization's data holdings as possible.

Phase 2: Valuation analysis of the exfiltrated data with respect to its content. For malicious actors interested in espionage or data resale, this is the final phase, followed by either intelligence exploitation or sale on the black market.

For ransomware actors, this phase is used to determine whether the victim organization will be a remunerative target. If the victim does not have insurance (self or otherwise), the ransomware organization usually drops the attack as having too low an ROI.

Phase 3: Execution of the malware attack. The success of this phase is directly proportional to the level of inconvenience the victim organization will suffer by being separated from its data.

Resiliency is provided by the system's mechanisms that act on Phases 2 and 3:

Phase 2 is frustrated by the use of pervasive, automated encryption such that when and if the malicious actors exfiltrate the data, it is rendered useless to them by virtue of being encrypted. The data thieves cannot sell what they cannot read, and the ransomware actor cannot make a go/no-go decision if the exfiltrated data cannot be analyzed.

Phase 3 is frustrated by the minimization of inconvenience; i.e., if the inconvenience is less than a day, the victim organization has no incentive to pay the ransom.

Consequently, various embodiments include both the "file management" (i.e., the rapid restoration capability) and the transparent application of pervasive, passive (i.e., no user action required) cryptography.

In various embodiments, a user employs a data entry mechanism and/or a pointing and selection mechanism to access a computing device on which one or more productivity applications and have been installed. In various embodiments, a productivity application is software used for producing information (such as documents, presentations, worksheets, databases, charts, graphs, digital paintings, electronic music and digital video), the output of which is saved as a file to a local or remote storage location.

The user employs the computing device to access a community definition manager via a networking and communications mechanism. The community definition manager enables the user to specify the members of the decentralized information management community, also known as peers. The user is able to add, update, and remove peers using the community definition manager. Only peers are able to participate in the data distribution scheme. However, just because a peer is part of the overall data distribution scheme does not mean that the peer has access to any particular datum.

The user is able to employ one or more productivity applications to create new data. Once the user has created data and decided to persist the data, the user employs the productivity application's persistence mechanism to initiate the save process. Once the save process is initiated, the data is intercepted by the data persistence manager. The data persistence manager works in concert with the cryptographic services manager, to transform the data so as to cryptographically guarantee its security and integrity, and to provide improvements with respect to the deterrence of data theft and availability attacks, such as ransomware. Once the cryptographic services manager has completed the cryptographic transformation, the transformed data is persisted locally by the data persistence manager, for example. All processing is conducted by the computer processor which implements the instructions from the other components.

Once data has been persisted, it is logged and subject to management by the data indexing and correlation mechanism.

Note that, at the stage of the process described above, the data has not yet been shared, and no improvements with respect to resilience as relates to denial of availability attacks have been realized.

Once the data has been persisted, the user is able to employ a combination of the data entry mechanism and (f) the pointing mechanism to access the data distribution manager. By using the data distribution manager relative to a specific datum or group of data, the user can specify the peers with which the datum/data can be made available.

Once the peers to which the data is to be made available are identified, the data indexing and correlation mechanism creates an awareness in the peers to which the data was made available of the data's availability. This is done in a decentralized manner between the data indexing and correlation mechanisms on the sharing (donor) peer and the realizing (recipient) peer, requiring no server or other centralizing mechanism. As part of the peer identification process, cryptographic keys unique to each of the peers that have been granted access to the datum/data are created.

A user employing a peer with awareness of a datum/data can opt to retrieve that datum/data. The user employs the data entry mechanism and/or the pointing and selection mechanism to issue instructions to the data indexing and correlation mechanism to locate the desired data. Note that the desired data may or may not be located on the system on which it was originated, and that the originating system may or may not be online when the data is located, and that the desired data may be located on multiple systems.

Once the desired datum/data is located, the data indexing and correlation mechanism initiates the retrieval of the desired datum/data. This retrieval may pull all or part of the desired datum/data from the originating system or each or any of the systems on which it is resident.

Once the datum/data has been successfully retrieved, it is decrypted, its integrity verified, it is persisted locally. As part of the local persistence, the data indexing and correlation mechanism is updated to reflect the datum's/data's availability at the instant peer.

Operational Implementation:

Once a datum or set of data has been shared with at least one other peer, the instant implementation has achieved resilience with respect to denial of availability attacks.

During operations, a peer initiates a retrieval by causing its local data indexing and correlation mechanism to search the decentralized network for a specific datum or set of data.

Upon completing the search, the data indexing and correlation mechanism causes the data distribution mechanism to retrieve the specified datum or data from one, many, or all of the locations where it has been located. In the event that the specified datum or data, or portion of the specified datum or data, cannot be located on a given peer, the data distribution mechanism automatically retrieves the data from another peer. As a result, the various embodiments separate data availability from the availability of a given peer.

Various embodiments, therefore, create inherent resilience to denial of availability attacks, viz.: 1) In conventional centralized data management system architectures, data is stored unencrypted, in plaintext format, and the security of the data is reflective of and dependent on the security provided for the network and device on which it is homed. Consequently, attackers need only successfully attack a single point (i.e., the server) to profitably harvest the organizations' data. In the secure decentralized model, cryptographic security is automated and therefore pervasive, and the attacker's success is no longer dependent on a successful breach, but rather on defeating global encryption standards, which have been determined to be secure against all known attacks. 2) In conventional centralized data management system architectures, attackers need only successfully attack a single point (i.e., the server) for data to be rendered unavailable to all nodes on the network. In the secured decentralized model, the attacker has to successfully attack all nodes (peers) on which the datum or data is resident to render it unavailable. If the attack fails against a single peer, it has failed in its entirety. This creates a state of strong resilience to denial of availability attacks.

By forcing attackers to both overcome global cryptographic standards and to proceed against all peers, various embodiments drive the cost of the attack upward asymptotically while concomitantly reducing the return on investment. As a result, various embodiments create a state of economic attack deterrence which contributes to the overall resilience improvement.

System for Sharing a File

Figure 5:
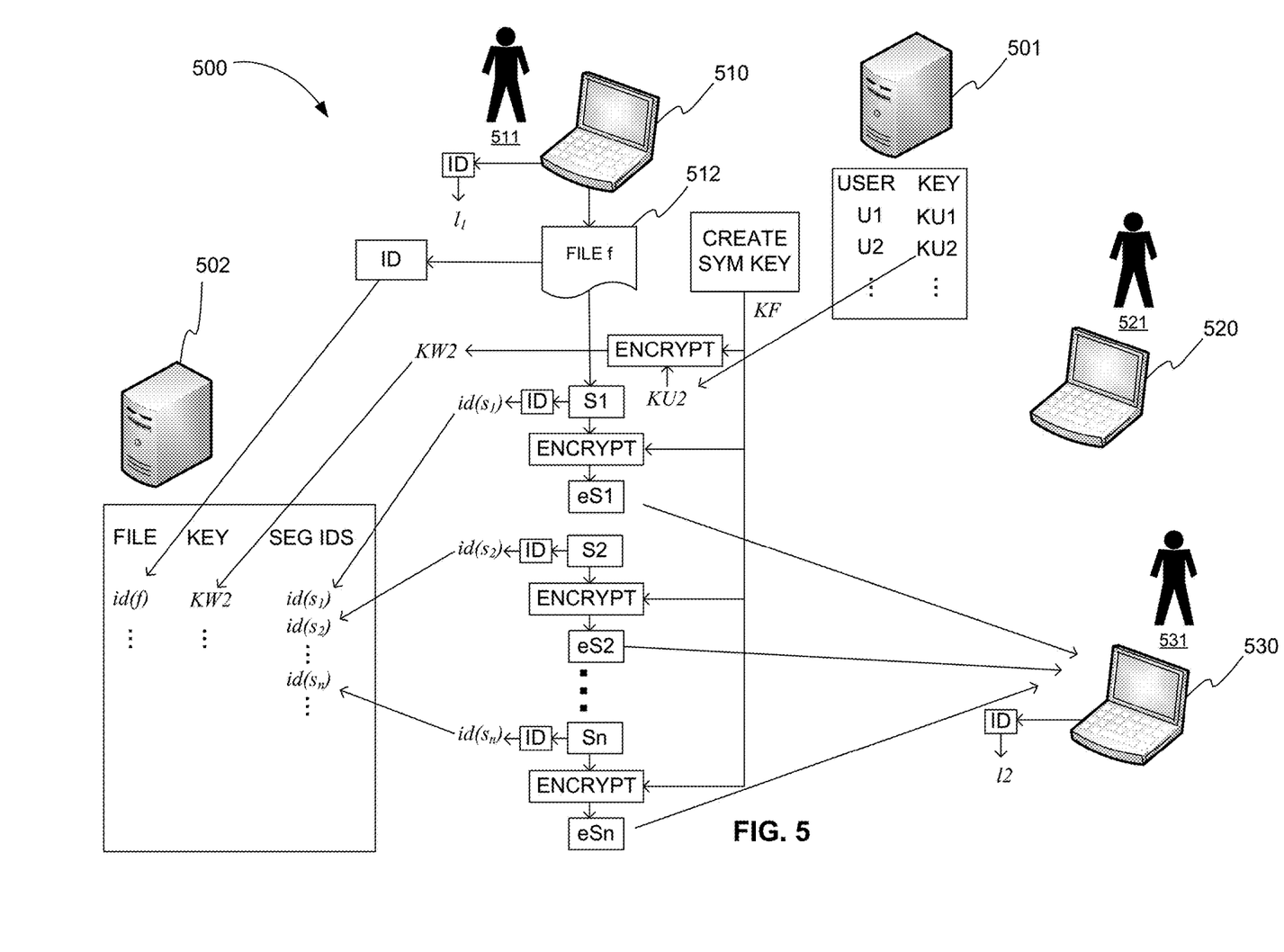
FIG. 5 is an exemplary diagram showing a system for securely sharing a file among peer devices in a distributed P2P filesystem, in accordance with various embodiments.

FIG. 5 is an exemplary diagram 500 showing a system for securely sharing a file among peer devices in a distributed P2P filesystem, in accordance with various embodiments. The system of FIG. 5 includes public-key server 501, content address server 502, and first peer device 510.

Public key server 501 stores one or more public keys of an asymmetric cryptographic algorithm for one or more users. Public key server 501 can be a computer service residing on any type of computer system including, but not limited to, the computer system of FIG. 1.

Content address server 502 stores information about one or more files. Like public key server 501, content address server 502 can be a computer service residing on any type of computer system including, but not limited to, the computer system of FIG. 1.

First peer device 510 is a computer system of the distributed P2P filesystem that is used for sharing files or segments of files. A peer device is typically a client computing device, such as a laptop computer, desktop computer, tablet computer, or smartphone, but can be any type of computing device that executes a client application for sharing files in the distributed P2P file system. A peer device, for example, can be the computer system of FIG. 1.

When, for example, a first user 511 saves a file f 512 that first user 511 wants to be sharable with a second user 521 of a second peer device 520, first peer device 510 performs several steps using a client application of the distributed P2P filesystem. First peer device 510 generates a unique identifier id(f) for file f 512 and stores the identifier id(f) on content address server 502. First peer device 510 can also, for example, store the identifier id(f) locally.

First peer device 510 divides file f 512 into n segments. First peer device 510 generates a unique identifier $id(s_i)$ for each segment $s_i$ of the n segments. First peer device 510 generates a symmetric encryption key KF for encrypting the n segments. First peer device 510 encrypts each of the n segments using the symmetric key KF using a symmetric encryption algorithm, producing n encrypted segments. First peer device 510 stores each encrypted segment $es_i$ of the n segments with its identifier $id(s_i)$ on the first peer device identified by a unique peer identifier $l_1$ and at least one other peer device identified by a unique peer identifier $l_2$. In various embodiments and as shown in FIG. 5, the n encrypted segments are stored on first peer device 510, which is location $l_1$. The n encrypted segments are also sent to a third peer device 530, which is location $l_2$. For each encrypted segment $es_i$, first peer device 510 stores the identifier $id(s_i)$ on content address server 502 with the identifier id(f).

Finally, first peer device 510 retrieves from public key server 501 a public key KU2 of second user 521 who can share file f 512, encrypts the symmetric key KF with the public key KU2 using an asymmetric encryption algorithm, producing wrapped key $KW2=EA_{KU2}(KF)$, and stores the wrapped key KW2 on content address server 502 with the identifier id(f), for example. First peer device 510 can also or alternatively, for example, store the wrapped key KW2 on first pear device 510. Essentially, the information stored on content address server 502 for the identifier id(f) makes file f 512 sharable by second user 521 using second peer device 520.

In various embodiments, filesystem maintains a list of trusted peer devices. Each encrypted segment $es_i$ of the n segments with its identifier $id(s_i)$ is stored on the first peer device identified by a unique peer identifier $l_1$ and every other peer on a list of trusted peer devices maintained by the filesystem.

In various embodiments, content address server 502 can be a distributed hash table. The identifier id(f) is then a cryptographic hash value h(f) and is generated using a cryptographic hashing algorithm. Also, the unique identifier $id(s_i)$ for each segment $s_i$ of the n segments is a cryptographic hash value $h(s_i)$ and is generated using the cryptographic hashing algorithm.

In various embodiments, the encryption of each segment is conducted integrally and automatically to the persistence of each segments of then segments of file f In various embodiments, first peer device 510 further notifies second peer device 520 of file f 512. For example, first peer device 510 sends the identifier id(f) to second peer device 520 used by second user 521 to let second user 521 know that file f 512 is available.

In various embodiments, first peer device 510 sends the identifier id(f) to second peer device 520 that the P2P filesystem application of second peer device 520 stores in the form of a symbolic link. Similarly, first peer device 510 can also send the wrapped key KW2 for second user 521 with identifier id(f) to second peer device 520. The P2P filesystem application of second peer device 520 then also stores the wrapped key KW2 for second user 521 in the symbolic link. In other words, to second user 521 of second peer device 520, file f 512 appears as any other file in the filesystem of second peer device 520 even though none of the segments of file f 512 may currently be stored on second peer device 520.

In addition, or alternately, if content address server 502 is a distributed hash table, when first peer device 510 stores the identifier id(f) on content address server 502 second peer device 520 is automatically notified of file f 512. For example, content address server 502 automatically publishes an update to the distributed hash table accessible to second peer device 520 when file f 512 is added. Second peer device 520 can also be automatically notified of the wrapped key KW2 for second user 521 for file f 512.

In various embodiments, first peer device 510 does not initially store the n encrypted segments, $es_i$, of file f 512 on any other peers. All of the n encrypted segments are only stored on another peer after that peer has received the identifier id(f) of file f 512 and opened the file. Opening the file on another peer, for example, causes then encrypted segments, $es_i$, of file f 512 to be transmitted to and received by that peer from one or more other peers.

In various embodiments, first peer device 510 stores segments across different peer devices. Specifically, first peer device 510 stores each segment $s_i$ of the n segments with its identifier id($s_i$) on a different peer device identified by a unique peer identifier $1_1$.

In various embodiments, redundancy is provided in segments stored across different peer devices using erasure coding. Specifically, first peer device 510 divides file f 512 using erasure coding so that file f 512 can be reconstructed from m segments of then segments where m<n.

In various embodiments, content address server 502 stores a wrapped key with a file identifier for each user that can share the file. For example, a wrapped key for first user 511 also needs to be stored with identifier id(f) so that first user 511 can reconstruct file f 512. Specifically, first peer device 510 further retrieves from public key server 501 a public key KU1 of first user 511, encrypts the symmetric key KF with the public key KU1 using the asymmetric encryption algorithm, producing wrapped key KW1=$EA_{KU1}$(KF), and stores the wrapped key KW1 on content address server 502 with the identifier id(f).

In various embodiments, content address server 502 additionally stores a user identifier with each wrapped key. Additionally, or alternatively, each wrapped key can be stored on a peer device along with the file identifier.

Method for Sharing a File

Figure 6:
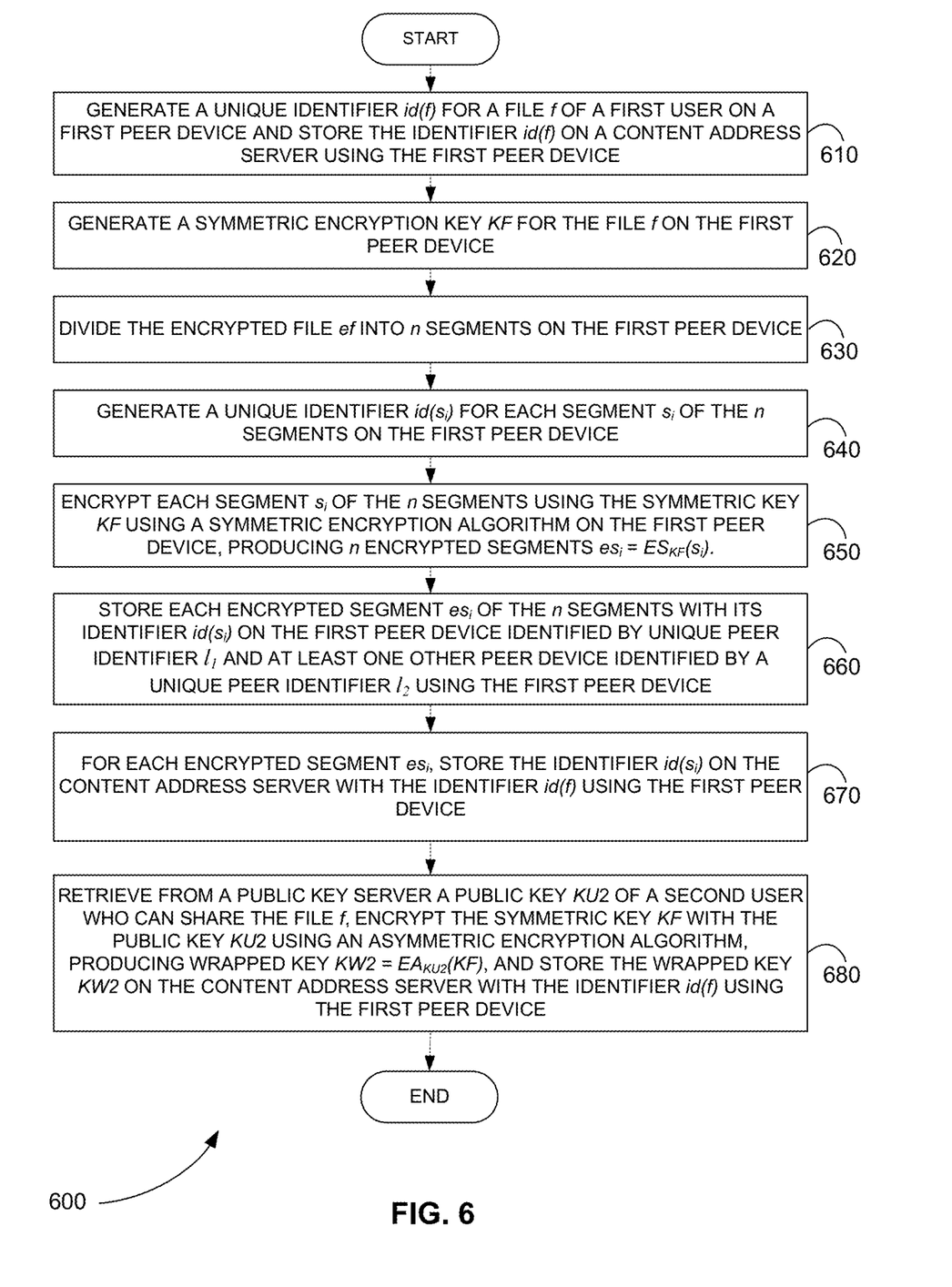
FIG. 6 is a flowchart showing a computer-implemented method for securely sharing a file among peer devices in a distributed P2P filesystem, in accordance with various embodiments.

FIG. 6 is a flowchart showing a computer-implemented method 700 for securely sharing a file among peer devices in a distributed P2P filesystem, in accordance with various embodiments.

In step 610 of method 600, a unique identifier id(f) is generated for a file f of a first user on a first peer device, and the identifier id(f) is stored on a content address server using the first peer device.

In step 620, a symmetric encryption key KF is generated for the file f on the first peer device.

In step 630, the file f is divided into n segments on the first peer device.

In step 640, a unique identifier id($s_i$) is generated for each segment $s_i$ of the n segments on the first peer device In step 650, each segment $s_i$ of the n segments is encrypted using the symmetric key KF using a symmetric encryption algorithm on the first peer device, producing n encrypted segments $es_i$=$ES_{KF}$($s_i$).

In step 660, each encrypted segment $es_i$ of the n segments is stored with its identifier id($s_i$) on the first peer device identified by a unique peer identifier $1_1$ and at least one other peer device identified by a unique peer identifier $1_2$ using the first peer device.

In step 670, for each encrypted segment $es_i$, the identifier id($s_i$) is stored on the content address server with the identifier id(f) using the first peer device.

In step 680, a public key KU2 of a second user who can share the filefis retrieved from a public key server. The symmetric key KF is encrypted with the public key KU2 using an asymmetric encryption algorithm, producing wrapped key KW2=$EA_{KU2}$(KF). The wrapped key KW2 is stored on the content address server with the identifier id(f) using the first peer device.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A computer-implemented method for securely sharing a file among peer devices in a distributed peer-to-peer filesystem, comprising:

generating a unique identifier id(f) for a file f of a first user on a first peer device and storing the identifier id(f) on a content address server using the first peer device;

generating a symmetric encryption key KF for the file f on the first peer device;

dividing the file f into n segments on the first peer device;

generating a unique identifier id($s_i$) for each segment $s_i$ of the n segments on the first peer device;

encrypting each segment $s_i$ of the n segments using the symmetric key KF using a symmetric encryption algorithm on the first peer device, producing n encrypted segments $es_i$=$ES_{KF}$($s_i$);

storing each encrypted segment $es_i$ of the n segments with its identifier id($s_i$) on the first peer device identified by a unique peer identifier $1_{i1}$ and at least one other peer device identified by a unique peer identifier $1_2$ using the first peer device;

for each encrypted segment $es_i$, storing the identifier id($s_i$) on the content address server with the identifier id(f) using the first peer device; and retrieving from a public key server a public key KU2 of a second user who can share the file f, encrypting the symmetric key KF with the public key KU2 using an asymmetric encryption algorithm, producing wrapped key KW2=$EA_{KU2}$(KF), and storing the wrapped key KW2 on the content address server with the identifier id(f) using the first peer device.

2. The method of claim 1, wherein the content address server comprises a distributed hash table.

3. The method of claim 1, wherein the encryption of each segment is conducted integrally and automatically to the persistence of each segments of then segments of file f.

4. The method of claim 2, wherein the identifier id(f) comprises a cryptographic hash value h(f) and is generated using a cryptographic hashing algorithm.

5. The method of claim 2, wherein the unique identifier id($s_i$) for each segment $s_i$ of the n segments comprises a cryptographic hash value h($s_i$) and is generated using a cryptographic hashing algorithm.

6. The method of claim 1, further comprising sending the identifier id(f) to a second peer device used by the second user using the first peer device.

7. The method of claim 1, wherein storing each encrypted segment $es_i$ of then segments with its identifier id($s_i$) on the first peer device by a unique peer identifier $1_1$ and at least one other peer device identified by a unique peer identifier $1_2$ comprises storing each encrypted segment $es_i$ of the n segments with its identifier id($s_i$) on the first peer device identified by a unique peer identifier $1_1$ and every other peer on a list of trusted peer devices maintained by the filesystem.

8. The method of claim 1, wherein dividing the file f into n segments on the first peer device further comprises using erasure coding so that the encrypted file of can be reconstructed from m segments of the n segments where m<n.

9. The method of claim 1, further comprising retrieving from the public key server a public key KU1 of the first user, encrypting the symmetric key KF with the public key KU1 using the asymmetric encryption algorithm, producing wrapped key KW1=$EA_{KU1}$(KF), and storing the wrapped key KW1 on the content address server with the identifier id(f) using the first peer device in order to make the file f accessible to the first user.

10. A system for securely sharing a file among peer devices in a distributed peer-to-peer filesystem, comprising:
   a public key server that stores one or more public keys of an asymmetric cryptographic algorithm for one or more users;
   a content address server that stores information about one or more files;
   a first peer device that
      generates a unique identifier id(f) for a file f of a first user and stores the identifier id(f) on the content address server,
      generates a symmetric encryption key KF for the file f,
      divides the file f into n segments on the first peer device,
      generates a unique identifier id($s_i$) for each segment $s_i$ of the n segments on the first peer device;
      encrypts each segment $s_i$ of the n segments using the symmetric key KF using a symmetric encryption algorithm on the first peer device, producing n encrypted segments $es_i$=$ES_{KF}$($s_i$),
      stores each encrypted segment $es_i$ of the n segments with its identifier id($s_i$) on the first peer device identified by a unique peer identifier $l_1$ and at least one other peer device identified by a unique peer identifier $l_2$,
      for each encrypted segment $es_i$, stores the identifier id($s_i$) on the content address server with the identifier id(f), and
      retrieves from the public key server a public key KU2 of a second user who can share the file f, encrypts the symmetric key KF with the public key KU2 using an asymmetric encryption algorithm, producing wrapped key KW2=$EA_{KU2}$(KF), and stores the wrapped key KW2 on the content address server with the identifier id(f).

11. The system of claim 10, wherein the content address server comprises a distributed hash table.

12. The system of claim 10, wherein the identifier id(f) comprises a cryptographic hash value h(f) and is generated using a cryptographic hashing algorithm.

13. The system of claim 10, wherein the unique identifier id($s_i$) for each segment s of the n segments comprises a cryptographic hash value h($s_i$) and is generated using a cryptographic hashing algorithm.

14. The system of claim 10, wherein the first peer device further sends the identifier id(f) to a second peer device used by the second user.

15. The system of claim 10, wherein the first peer device stores each encrypted segment $es_i$ of the n segments with its identifier id($s_i$) on the first peer device by a unique peer identifier $l_1$ and at least one other peer device identified by a unique peer identifier $l_2$ comprises
   storing each encrypted segment $es_i$ of the n segments with its identifier id($s_i$) on the first peer device identified by a unique peer identifier $l_1$ and every other peer on a list of trusted peer devices maintained by the filesystem.

16. The system of claim 10, wherein the first peer device divides the file f into n segments on the first peer device further comprises
   using erasure coding so that the encrypted file of can be reconstructed from m segments of the n segments where m<n.

17. The system of claim 10, wherein the first peer device further retrieves from the public key server a public key KU1 of the first user, encrypting the symmetric key KF with the public key KU1 using the asymmetric encryption algorithm, producing wrapped key KW1=$EA_{KU1}$(KF), and stores the wrapped key KW1 on the content address server with the identifier id(f) in order to make the file f accessible to the first user.

* * * * *